United States Patent
Matthey et al.

(10) Patent No.: US 11,293,662 B2
(45) Date of Patent: Apr. 5, 2022

(54) HVAC ACTUATOR

(71) Applicant: BELIMO HOLDING AG, Hinwil (CH)

(72) Inventors: Gaëtan Matthey, Gibswil (CH); Silvio Grogg, Gossau (CH); Peter Schmidlin, Uster (CH)

(73) Assignee: BELIMO HOLDING AG, Hinwil (CH)

( * ) Notice: Subject to any disclaimer, the term of this patent is extended or adjusted under 35 U.S.C. 154(b) by 70 days.

(21) Appl. No.: 16/341,167

(22) PCT Filed: Dec. 7, 2017

(86) PCT No.: PCT/EP2017/081789
§ 371 (c)(1),
(2) Date: Apr. 11, 2019

(87) PCT Pub. No.: WO2018/104431
PCT Pub. Date: Jun. 14, 2018

(65) Prior Publication Data
US 2020/0182506 A1   Jun. 11, 2020

(30) Foreign Application Priority Data

Dec. 8, 2016 (CH) ................................ 01616/16

(51) Int. Cl.
*F24F 11/88* (2018.01)
*F24F 11/46* (2018.01)
(Continued)

(52) U.S. Cl.
CPC .............. *F24F 11/88* (2018.01); *F24F 11/46* (2018.01); *F24F 11/56* (2018.01)

(58) Field of Classification Search
CPC .. F24F 11/88; F24F 11/46; F24F 11/56; H02P 2205/03; H02J 7/345; H02J 1/00
See application file for complete search history.

(56) References Cited

U.S. PATENT DOCUMENTS 4,361,731 A * 11/1982 Smoot ................. H04M 17/023
379/154
5,744,923 A * 4/1998 Strauss .................... G05B 9/02
318/430
(Continued)

FOREIGN PATENT DOCUMENTS

CH      707 624 A1   8/2014
CN    101147355 A    3/2008
(Continued)

OTHER PUBLICATIONS

International Search Report for PCT/EP2017/081789 dated Mar. 20, 2018 [PCT/ISA/210].
(Continued)

*Primary Examiner* — Thomas C Lee
*Assistant Examiner* — Anzuman Sharmin
(74) *Attorney, Agent, or Firm* — Sughrue Mion, PLLC

(57) ABSTRACT

An HVAC actuator (1) comprises an electric motor (11); an energy buffer (13) configured to store electrical energy from a power supply (2), and to provide the electrical energy to the motor (11); and a power limiting circuit (12) configured to limit input power from the power supply (2) to the energy buffer (13) to a threshold lower than motor power drawn by the motor (11) from the energy buffer (13).

27 Claims, 2 Drawing Sheets

(51) Int. Cl.
*F24F 11/56* (2018.01)
*H02J 7/34* (2006.01)

(56) References Cited

U.S. PATENT DOCUMENTS

| | | | | |
|---|---|---|---|---|
| 5,779,097 | A * | 7/1998 | Olson | B67D 7/0496 |
| | | | | 141/59 |
| 6,257,549 | B1 * | 7/2001 | Hopper | H02J 9/06 |
| | | | | 251/129.11 |
| 2006/0164769 | A1 * | 7/2006 | Stanford | H04L 49/351 |
| | | | | 361/87 |
| 2008/0030178 | A1 * | 2/2008 | Leonard | H02M 3/156 |
| | | | | 323/282 |
| 2010/0007301 | A1 * | 1/2010 | Ochsenbein | H02J 9/062 |
| | | | | 318/563 |
| 2010/0231049 | A1 * | 9/2010 | Hinton | H02J 9/061 |
| | | | | 307/66 |
| 2013/0234057 | A1 * | 9/2013 | Muller | F16K 31/04 |
| | | | | 251/129.11 |
| 2014/0117890 | A1 * | 5/2014 | Lee | B60R 16/03 |
| | | | | 318/139 |
| 2014/0190713 | A1 * | 7/2014 | Martinsson | A01G 3/086 |
| | | | | 173/20 |
| 2015/0361627 | A1 * | 12/2015 | Frelich | B60W 10/30 |
| | | | | 180/65.245 |
| 2016/0061480 | A1 * | 3/2016 | Alexander | F24F 11/30 |
| | | | | 307/109 |
| 2017/0093329 | A1 * | 3/2017 | Jensen | F24S 30/425 |
| 2017/0132574 | A1 * | 5/2017 | Wu | H04W 4/80 |
| 2017/0326995 | A1 * | 11/2017 | Kotani | B60L 53/126 |
| 2018/0216746 | A1 * | 8/2018 | Kellicker | H02P 7/04 |

FOREIGN PATENT DOCUMENTS

| | | |
|---|---|---|
| CN | 101454960 A | 6/2009 |
| CN | 101785037 A | 7/2010 |
| CN | 105356825 A | 2/2016 |
| WO | 2007/134471 A1 | 11/2007 |

OTHER PUBLICATIONS

Swiss Search Report for CH 01616/16 dated Apr. 10, 2017 [PCT/ISA/201].

English Translation of Communication dated Jun. 12, 2020 by National Intellectual Property Administration of the P. R. China in Application No. 201780075907.6.

* cited by examiner

HVAC ACTUATOR

CROSS REFERENCE TO RELATED APPLICATIONS

This application is a National Stage of International Application No. PCT/EP2017/081789 filed Dec. 7, 2017, claiming priority based on Swiss Patent Application No. 01616/16 filed Dec. 8, 2016.

FIELD OF THE INVENTION

The present invention relates to an HVAC actuator, a system of HVAC actuators and a method of operating an HVAC actuator. Specifically, the present invention relates to an HVAC actuator, a system of HVAC actuators and a method of operating an HVAC actuator whereby the HVAC actuator comprises an electric motor.

BACKGROUND OF THE INVENTION

HVAC actuators comprising electric motors are commonly used to control HVAC devices, such as dampers or valves. The power consumed by the motor of the HVAC actuators is typically provided by mains supply which requires an adequate wiring of the HVAC actuators. Solutions using batteries or accumulators offer to some extent independency from external power supply, but often suffer from limited running time due to discharging processes or the considerable power consumption of the HVAC actuator. Further issues related to power supply may arise during installation of the HVAC actuators as the electrical wiring may not have been done and electrical power may initially not be available, and therefore, initial testing of the mechanical installation of the actuators in powered mode is not possible.

A power supply for a radiator thermostat using an energy storage and a thermoelectric energy converter for converting heat of a heating liquid into electrical energy is described in DE102013110821 A1. The thermoelectric energy converter is on one side coupled to the heating valve as a heat source and on another side coupled to a heat sink such as a housing of the radiator thermostat. The converted electrical energy is used for controlling and driving an electrical motor of a heating valve actuator. The energy storage includes, for example, an accumulator or a capacitor for receiving excess conversion energy.

DE102010033428 A1 describes a controller for an actuator with a power supply, wherein the power supply includes an energy converter for converting energy from the surroundings into electrical energy. The power supply further includes an energy storage for storing the converted energy. The energy converter converts heat from the surroundings and relies on the Peltier or the Seebeck effect. A temperature gradient usually present in the heating circuit can be used to apply such an energy conversion to a heating control. The energy converter can also convert mechanical oscillations, light, force electromagnetic fields etc. into electrical energy. The converted electrical energy is stored in an energy storage which can be an accumulator or a capacitor. As long as the energy storage is not fully loaded, the energy obtained from the energy converter is almost completely loaded into the energy storage.

The prior art describing power supplies with energy storage means have in common that an energy converter is foreseen for converting energy from the surroundings to electrical energy which is stored in the energy storage. Further, incoming energy is, whenever possible, fully extracted and loaded onto the energy storage in order to have the energy available for later application, without specific control of the power input to the HVAC actuator.

SUMMARY OF THE INVENTION

It is an object of the invention to provide an HVAC actuator, a system of HVAC actuators and a method of operating an HVAC actuator, which at least partially improve the prior art and avoid at least part of the mentioned disadvantages of the prior art.

According to the present invention, this object is achieved by the features of the independent claims. In addition, further advantageous embodiments follow from the dependent claims and the description.

According to an aspect of the invention, the object is particularly achieved by an HVAC actuator, comprising an electric motor, wherein the HVAC actuator further comprises an energy buffer configured to store electrical energy from a power supply, and to provide the electrical energy to the motor. The HVAC actuator further comprises a power limiting circuit configured to limit input power from the power supply to the energy buffer to a threshold lower than motor power drawn by the motor from the energy buffer. The energy buffer has the advantage that an increased independency from the external power supply can be provided by storing electrical energy from the power supply in the energy buffer and controllably providing the electrical energy to the motor and/or further HVAC actuator components, when the energy is needed. The power limiting circuit has the advantage that input power can controllably be drawn from the power supply by limiting the input power to the threshold. Owing to the energy buffer configured to store electrical energy, the threshold can be set to be lower than motor power drawn by the electric motor from the energy buffer, such that an HVAC actuator with a lower input power demand can be provided. This has the advantage that smaller and, in particular, cheaper power supplies can be used. The threshold can initially be preset or be configurable in situ.

In an embodiment, the energy buffer is configured to accumulate and to store electrical energy during an idle time $t_{idle}$ of the motor and to provide electrical energy to the motor during an active time $t_{active}$ of the motor. Typically, the HVAC devices, such as damper blades, valves etc., do not change their position or state (e.g. open/closed) continuously, but remain in a certain position between changing the position, such that motors of HVAC actuators driving the HVAC devices can stay idle when the position of the HVAC device is kept constant. During the idle time $t_{idle}$, power for changing the actuator position is therefore not required and typically only residual power is consumed by the electronics of the HVAC actuator, for example by a motor controller. In an embodiment, the energy buffer accumulates and stores electrical energy only during the idle time $t_{idle}$. Optionally, the energy buffer can accumulate and store the electrical energy also during the active time $t_{active}$ of the motor.

In an embodiment, the power limiting circuit is configured to set the threshold such that the electrical energy stored in the energy buffer during the idle time $t_{idle}$ is sufficient to drive the motor during the active time $t_{active}$. Typically, motors of HVAC actuators exhibit active times which are shorter than idle times, due to the typical situation that the HVAC devices driven by the HVAC actuators remain in a certain position most of the time and the position of the HVAC devices is usually changed intermittently.

In an embodiment, the HVAC actuator further comprises a motor controller configured to monitor an operating condition of the energy buffer. The motor controller is further configured to store a safety position and to drive the motor to the safety position, depending on the operating condition of the energy buffer, using electrical energy stored in the energy buffer. The operating condition of the energy buffer can be based at least on one of, for example, voltage, charge, energy, power of the energy buffer indicating the performance and/or ageing of the energy buffer. For the case that the operating condition monitored by the motor controller indicates that the performance of the energy buffer has been degraded, the motor controller may drive the motor to the safety position, such that accidental driving into an erroneous position of the motor due to a low performance of the energy buffer can be avoided.

In an embodiment, the power limiting circuit is configured to set the threshold such that the electrical energy stored in the energy buffer is sufficient to feed the motor controller.

Optionally, the HVAC actuator further comprises at least one sensor, for example for variable air volume (VAV) control, temperature control, humidity control etc. Advantageously, the power limiting circuit may be configured to set the threshold such that the electrical energy stored in the energy buffer is sufficient to feed the at least one sensor.

In an embodiment, the HVAC actuator further comprises a regulator configured to convert input voltage of the HVAC actuator to a voltage lying in a voltage range of the energy buffer.

In an embodiment, the regulator is a switching regulator.

In an embodiment, the power limiting circuit is configured to adjust the threshold depending on a conversion efficiency $\eta_{regulator}$ of the regulator. This has the advantage that the power limiting circuit can adjust the threshold to compensate power loss by the regulator and to maintain sufficient power output from the regulator to the energy buffer.

In an embodiment, the power limiting circuit and the regulator are integrated in a single power limiting unit.

For the case of zero input power to the HVAC actuator, the energy buffer may be configured to operate in a battery mode for driving the motor during a time $t_{batt}$. The energy buffer running in a battery mode is understood as the energy buffer being able to provide electrical energy for a duration of time $t_{batt}$, without being connected to an external power supply.

In an embodiment, the energy buffer is a Lithium-ion capacitor. Lithium-ion capacitors have the advantage of high energy densities yielding low space requirements inside the HVAC actuators and low self-discharge rates offering high reliability, especially for running in battery mode.

In an embodiment, the HVAC actuator further comprises an activation switch configured to activate the HVAC actuator, from a deactivated, energy conserving state to an active state, for the case of zero input power to the HVAC actuator.

According to a further aspect, the present invention is also directed to a system comprising a plurality of HVAC actuators according to the present invention, connected to a common power supply line, wherein the power supply line provides input power to the HVAC actuators, the input power in each case being limited by the power limiting circuits of the HVAC actuators. The system comprising a plurality of HVAC actuators with power limiting circuits has the advantage of increased controllability in distribution of power of the common power supply line to the plurality of the HVAC actuators.

In an embodiment, the power limiting circuits of the HVAC actuators are configured to adjust the thresholds depending on the number of HVAC actuators connected to the common power supply line. This has the advantage that the system can adapt to the actual number of HVAC actuators connected to the power supply line, for example, if an additional HVAC actuator is additionally coupled to the power supply line or if an HVAC actuator is removed from the power supply line. Thereby, a risk of overloading the power supply line can be avoided, if, for example, additional HVAC actuators are coupled to the power supply line. Accordingly, an optimal load of the power supply line can be ensured, if, for example, some HVAC actuators are removed from the power supply line.

In an embodiment, the power limiting circuits of the HVAC actuators are configured to adjust the thresholds depending on the power of the common power supply line. This has the advantage that the system can adapt to characteristics of the common power supply line, for example the maximum power that can be delivered by the power supply line, which may be considerably lower than the motor power drawn by each of the HVAC actuators.

In an embodiment, the common power supply line comprises a power over Ethernet line.

According to a further aspect, the present invention is also directed to a method of operating an HVAC actuator comprising an electric motor, whereby the method comprises: storing electrical energy from a power supply in an energy buffer of the HVAC actuator and providing the electrical energy to the motor; limiting by a power limiting circuit of the HVAC actuator input power from the power supply to the energy buffer to a threshold lower than motor power drawn by the motor from the energy buffer.

In an embodiment of the method, the energy buffer is loaded with an initial energy sufficient to drive the actuator in battery mode for a predetermined time $t_{batt}$ prior to initial operation of the HVAC actuator.

According to a further aspect, the present invention is directed to an HVAC actuator comprising an electric motor, the HVAC actuator further comprising an energy buffer configured to store electrical energy from a power supply, and to provide the electrical energy to the motor, wherein the HVAC actuator further comprises an activation switch configured to activate the HVAC actuator, from a deactivated, energy conserving state to an active state, for the case of zero input power to the HVAC actuator. The activation switch is particularly advantageous for initial operation of the HVAC actuator, for example at installation time, when an external power supply is not yet available or connected. When the HVAC actuator is stored prior to first use, the HVAC actuator is set in the deactivated state, completely shut down, in order to prevent or to at least minimize discharge of preloaded initial energy of the energy buffer during storage.

As a particular advantage, the activation switch makes it possible to set the HVAC actuator in active state, activating the HVAC actuator for operation in battery mode. After initial operation during a time $t_{batt}$, which may include tasks such as, for example, actuator adaptation by driving the HVAC actuator to its maximal angular positions, the activation switch can be used for re-shutting down the HVAC actuator, setting the HVAC actuator into the deactivated, energy conserving state.

In an embodiment, the activation switch is configured to activate the HVAC actuator only for at least a time $t_{batt}$ for initial operation, after which the HVAC actuator returns to the deactivated, energy conserving state.

In an embodiment, the activation switch comprises a manual switch for manual activation.

In an embodiment, the HVAC actuator further comprises a near field communication (NFC) module configured to activate the HVAC actuator, from a deactivated, energy conserving state to an active state. The NFC module may be connected to the activation switch. The NFC module has the advantage of enabling a contactless activation of the HVAC actuator. Further, the NFC module may be used for information exchange for selecting initial operation tasks.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
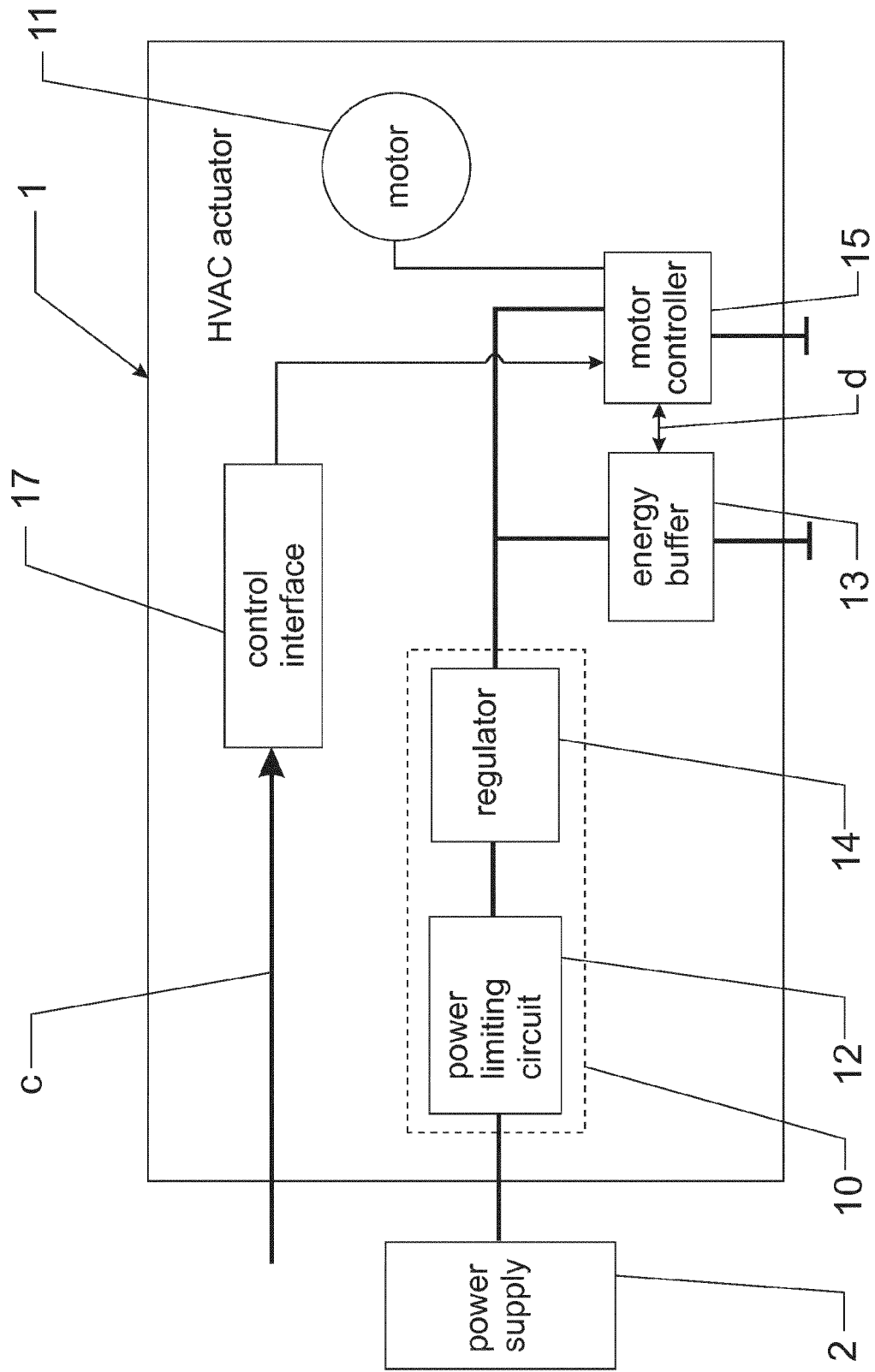
FIG. 1: shows a block diagram illustrating schematically an embodiment of an HVAC actuator comprising an energy buffer and a power limiting circuit.

FIG. 1 shows a block diagram of an embodiment of an HVAC actuator 1 which receives electrical power from an external power supply 2 via a wire connection. The HVAC actuator 1 comprises an electric motor 11, which is used to drive an HVAC device such as a damper or a valve, etc. The input power from the power supply 2 is limited by a power limiting circuit 12 to a threshold $P_{th}$. The threshold $P_{th}$ may be configurable by the power limiting circuit 12. The power limiting circuit 12 can comprise shunt elements and/or control circuitry. The power limited by the power limiting circuit 12 is fed to a regulator 14, which regulates supply voltage of the power supply 2, typically 24 V, to a voltage in a range of an energy buffer 13, which is arranged downstream of the regulator 14. Preferably, the regulator 14 is a switching regulator, which offers high efficiency, low power dissipation and high power density. The high power density of the switching regulator has the advantage that space requirements can be kept small inside the HVAC actuator 1. The efficiency $\eta_{regulator}$ of the switching regulator can be as high as 80% or higher. The threshold $P_{th}$ is lower than the electrical motor power $P_{motor}$ drawn by the motor 11 from the energy buffer 13 arranged in the HVAC actuator 1. The threshold $P_{th}$ can be adjusted depending on various circumstances, for example depending on the motor power $P_{motor}$, on the power supplied by the power supply 2, etc. The energy buffer 13 is arranged downstream of the power limiting circuit 12 and is configured to store electrical energy from the power supply 2 and to provide the stored electrical energy to the motor 11. Typically, the motor 11 of the HVAC actuator 1 is driving the HVAC device during an active time $t_{active}$. During the rest of the time $t_{idle}$, the HVAC device stays idle and typically only residual power is consumed by the electronics of the HVAC actuator 1, for example by a motor controller 15. Therefore, the energy buffer 13 has to provide electrical energy to the motor 11 for changing the actuator position during the active time $t_{active}$. During the idle time $t_{idle}$, and optionally also during the active time $t_{active}$, the energy buffer 13 accumulates and stores electrical energy.

In an embodiment, the power limiting circuit 12 and the regulator 14 are integrated in a single power limiting unit 10, as symbolized by the dashed box.

The regulator 14 outputs an electrical loading power $P_{load}$ which is related to the threshold $P_{th}$ as follows:

$$P_{load} \approx \eta_{regulator} P_{th}$$

The loading power $P_{load}$ is used to load the energy buffer 13 at least during the idle time $t_{idle}$, such that the electrical energy accumulated and stored at least during the idle time $t_{idle}$ is sufficient for the energy consumption of the motor 11 during the active time $t_{active}$. Further, the electrical energy accumulated and stored at least during the idle time $t_{idle}$ is sufficient for the residual power consumption of the electronics of the HVAC actuator 1. The loading power $P_{load}$ therefore satisfies the following relation:

$$P_{load} \geq \frac{t_{active}}{t_{idle}} P_{motor}$$

As an example, the motor 11 exhibits a maximum motor current of 60 mA at a voltage of 3.3 V, such that the motor power is 200 mW. Assuming that the motor 11 drives an HVAC device during an active time $t_{active}$ which is half of the idle time $t_{idle}$, the loading power $P_{load}$ should at least be 100 mW. Together with the motor voltage of 3.3 V this yields a loading current of 30 mA during the idle time $t_{idle}$. With an efficiency $\eta_{regulator}$ of the regulator 14 of 80%, the configurable threshold $P_{th}$ to the input power is adjusted to ca. 125 mW in order to achieve the loading power $P_{load}$ of ca. 100 mW.

The energy buffer 13 is preferably a Lithium-ion capacitor (LIC), which has the advantage of a high energy density and a low self-discharge rate. The voltage range is typically between 2 V and 3.5 V, which advantageously corresponds to the range of the motor electronics. Especially, using a motor controller 15 with a voltage range corresponding to the voltage range of the energy buffer 13, no up-conversion is necessary, which reduces the costs and the space required in the HVAC actuator 1.

In the embodiment shown in FIG. 1, the HVAC actuator 1 further comprises a motor controller 15. The motor controller 15 may comprise a microcontroller. In an embodiment, the motor controller 15 comprises a motor driver IC. The energy buffer 13 provides electrical energy to the motor controller 15. The motor controller 15 drives the motor 11 and draws the motor power from the energy buffer 13. Accordingly, the loading power $P_{load}$ satisfies the following relationship $$P_{load} \geq \frac{t_{active}}{t_{idle}} (P_{motor} + P_{control})$$

such that the energy buffer 13 stores sufficient energy at least in the idle time $t_{idle}$, that can be provided to the motor 11 and the motor controller 15 during the active time $t_{active}$.

The motor controller 15 is configured to monitor an operating condition of the energy buffer 13, which is symbolized by the double arrow d. Depending on the operating condition of the energy buffer 13, the motor controller 15 can prompt the motor 11 to drive to a safety position which is stored in the motor controller 15. This can for example be the case, if the motor controller 15 monitors the ageing of the energy buffer 13 based on, for example, the discharge rate, maximum stored energy etc., and detects that the performance of the energy buffer 13 has considerably degraded. In that case, the motor controller 15 controls the motor 11, respectively, to move to or drive an actuated part to a safety position, such that an accidental moving or driving to an erroneous position, due to a poor performance of the energy buffer 13, can be avoided. For obtaining the safety position, the energy buffer 13 is configured to provide the electrical energy to drive the motor 11 to the safety position. For example, the energy buffer 13 comprises a separate safety storage where the electrical energy, required for one-time driving the motor 11 into the safety position, is stored.

In an embodiment, the HVAC actuator 1 comprises a communication unit (not shown in FIG. 1), which can be used to send out a signal to an external maintenance site or an indication unit which indicates the condition of the energy buffer 13, such that a maintenance of the HVAC actuator 1 can be initiated when the safety position is taken by the motor 11. In an embodiment, the condition of the energy buffer 13 can be monitored by a separate diagnose unit (not shown in FIG. 1).

The HVAC actuator 1 further comprises a control interface 17 which receives an external control input symbolized by the arrow c. The control interface 17 transfers the external control input to the motor controller 15. Depending on the embodiment, the control interface 17 is an analogue or digital control interface. For example, the control interface 17 is based on a conventional interface for HVAC actuators, such as multi-point (MP), building automation and control network (BACnet), Modbus etc. In a variant, the control interface 17 includes a wireless network interface. In some embodiments, the control interface 17 includes an analogue interface with a control signal or operating range between 0 to 10 V or 2 to 10 V, such as for example used for spring-return actuators.

During first time installation of the HVAC actuator 1, there is typically no power supply connected to the HVAC actuator 1. The input power is therefore zero. Conventionally, the person installing the HVAC actuator 1 manually drives the HVAC device into the desired starting position (for example a certain open and/or closed position for dampers or for valves), for example by using a hand wheel. Especially for HVAC actuators installed in positions difficult to access, this can be cumbersome.

The energy buffer 13, especially in embodiments where the energy buffer is a LIC, can operate in a battery mode for driving the motor 11 during a time $t_{batt}$, during which the HVAC actuator is not connected to an external power supply. In an embodiment, the energy buffer 13 is loaded prior to first use with an initial energy sufficient to drive the motor 11 in battery mode. Therefore, a manual driving of the HVAC device into the desired starting position can be avoided at installation since the energy buffer 13 is able to provide the required initial energy. Prior to first use, the HVAC actuator 1 is preferably completely shut down, i.e. set in a deactivated, energy conserving state, in order to prevent or at least minimize discharge of the loaded energy buffer 13 during storage of the HVAC actuator 1, e.g. unused in a box. At installation time, the completely shut down HVAC actuator 1 can be activated by an activation switch (not shown in the Figures), which may comprise a manual switch (e.g. a button) or be connected to an NFC module and is configured to place the HVAC actuator 1 from the deactivated, energy conserving state to an active state where the HVAC actuator 1 is powered by the energy buffer 13 in the case of zero input power. For example, in the deactivated state, the motor 11 is electrically disconnected from the energy buffer 13 by the switch.

Figure 2:
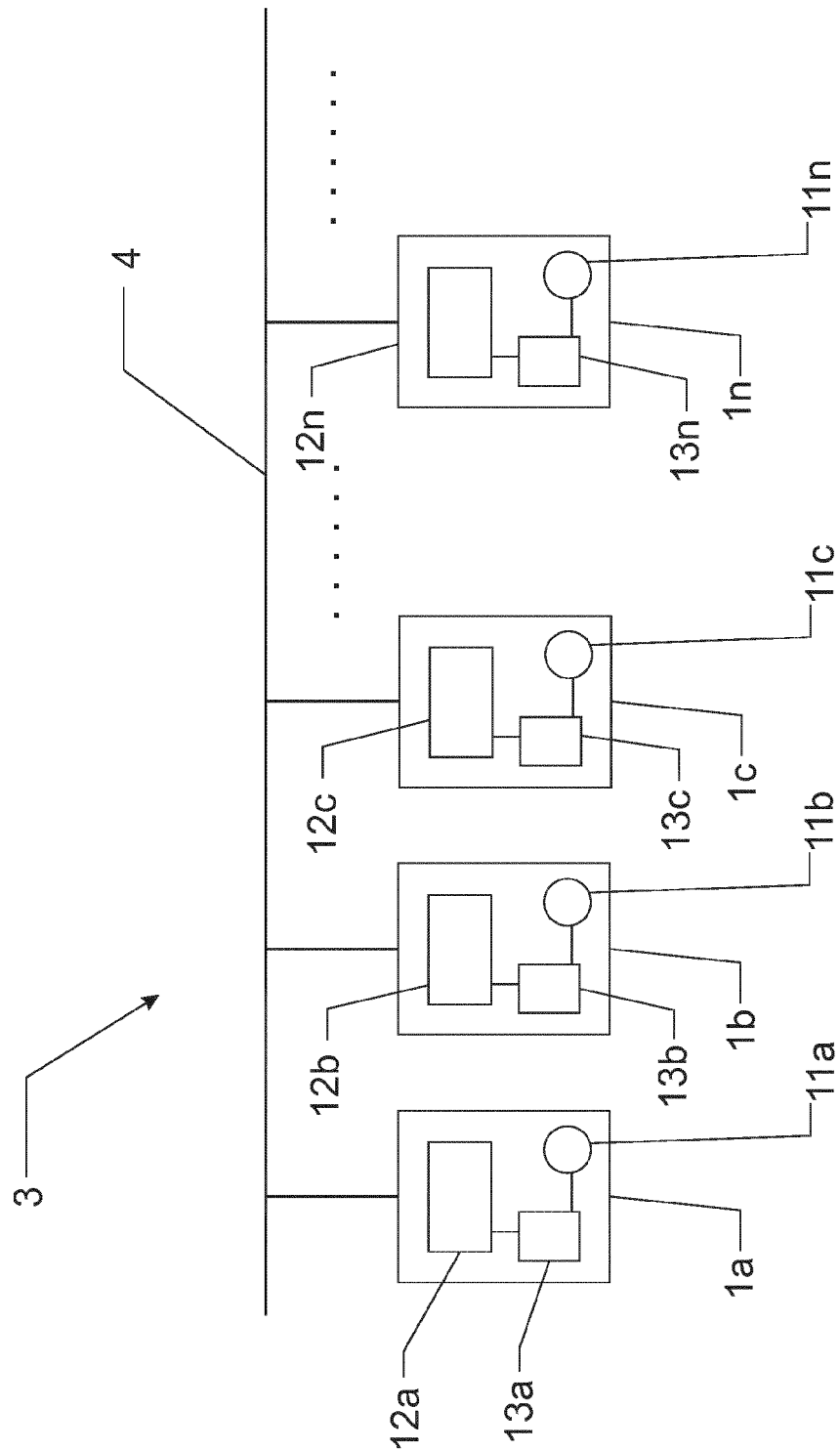
FIG. 2: shows a block diagram illustrating schematically an embodiment of a system comprising a plurality of HVAC actuators.

FIG. 2 shows a block diagram of an embodiment of a system 3 comprising a plurality of HVAC actuators 1a, 1b, 1c, . . . , 1n, . . . coupled to a common power supply line 4, which supplies input power to the HVAC actuators 1a, 1b, 1c, . . . , 1n, . . . The dotted line between the HVAC actuator 1c and 1n and after the HVAC actuator 1n symbolizes further HVAC actuators, which are coupled to the same common power supply line 4, but are for simplicity not shown in FIG. 2. The HVAC actuator 1a comprises a power limiting circuit 12a, an energy buffer 13a, and an electric motor 11a. The respective power limiting circuits 12b, 12c, 12n, energy buffers 13b, 13c, 13n and electric motors 11b, 11c, 11n are shown for the HVAC actuators 1b, 1c and 1n. The power limiting circuits 12a, 12b, 12c, . . . , 12n, . . . of the HVAC actuators 1a, 1b, 1c, . . . , 1n, . . . limit input power from the common power supply line 4 to the energy buffer 13a, 13b, 13c, . . . , 13n, . . . to a threshold $P_{th}$ lower than motor power drawn by the motors 11a, 11b, 11c, . . . , 11n, . . . from the energy buffers 13a, 13b, 13c, . . . , 13n, . . . Typically, the threshold $P_{th}$ is the same for all HVAC actuators 1a, 1b, 1c, . . . , 1n. In some embodiments, the thresholds $P_{th}$ may vary from HVAC actuator to HVAC actuator 1a, 1b, 1c, . . . , 1n, depending on the specific application. The energy buffers 13a, 13b, 13c, . . . , 13n, . . . accumulate and store electrical energy, and provide the electrical energy to the motors 11a, 11b, 11c, . . . , 11n, . . . .

The shown system 3, comprising a plurality of HVAC actuators 1a, 1b, 1c, . . . , 1n, . . . with power limiting circuits 12a, 12b, 12c, . . . , 12n, . . . , has the advantage that the power P of the common power supply line 4 can controllably be distributed to the plurality of HVAC actuators 1a, 1b, 1c, . . . , 1n, . . . coupled to the common power supply line 4. This is particularly advantageous, if the common power supply line 4 provides a power which is lower than the motor power drawn by the motors 11a, 11b, 11c, . . . , 11n, . . . from the energy buffers 13a, 13b, 13c, . . . , 13n, . . . , which is for example the case for an embodiment where the common power supply line comprises a Power over Ethernet (PoE) line. Especially, the power of the common power supply line 4 may be sufficient to supply one or a certain number $n_1$ of HVAC actuators, but may not be sufficient, if a number $n_2 > n_1$ of HVAC actuators are coupled to the common power supply line 4. By limiting the input power for each HVAC actuator, the system can operate even for the $n_2$ HVAC actuators, without the power supply line 4 being overloaded.

For the case of n HVAC actuators coupled to the common power supply line 4, the threshold $P_{th}$ may be set to P/n, such that an overload of the common power supply line 4 can controllably be avoided. Accordingly, the level of power required from the power supply line can be reduced, since the input power is limited by the power limiting circuits and distributed to the plurality of HVAC actuators. The limited input power P/n per HVAC actuator can be accumulated and stored in the respective energy buffers 13a, 13b, 13c, . . . , 13n, . . . at least during the idle time $t_{idle}$ of the motors 11a, 11b, 11c, . . . , 11n, . . . and provided to the motors 11a, 11b, 11c, . . . , 11n, . . . during the active time $t_{active}$. In an embodiment, the HVAC actuators 1a, 1b, 1c, . . . , 1n, . . . are centrally controllable using control interfaces (not shown in FIG. 2), such that the thresholds $P_{th}$ can centrally be adjusted. This has for example the advantage that the thresholds $P_{th}$ can be readjusted, if one of the HVAC actuators fails (for example after the motor being driven to a safety position) or if an additional HVAC actuator is coupled to the common power supply line 4.

The invention claimed is:

1. An HVAC actuator, comprising an electric motor, wherein the HVAC actuator further comprises:
   an energy buffer configured to store electrical energy from a power supply, and to provide the electrical energy to the electric motor; and
   a power limiting circuit configured to limit input power from the power supply to the energy buffer to a threshold lower than motor power drawn by the electric motor from the energy buffer,
   wherein the HVAC actuator further comprises a motor controller configured to monitor an operating condition of the energy buffer, to store a safety position, and to drive the electric motor to the safety position depending on the operating condition of the energy buffer, using electrical energy stored in the energy buffer.

2. The HVAC actuator according to claim 1, wherein the energy buffer is configured to accumulate and to store electrical energy during an idle time of the electric motor and to provide electrical energy to the electric motor during an active time of the electric motor.

3. The HVAC actuator according to claim 2, wherein the power limiting circuit is configured to set the threshold such that the electrical energy stored in the energy buffer during the idle time is sufficient to drive the electric motor during the active time.

4. The HVAC actuator according to claim 1, wherein the power limiting circuit is configured to set the threshold such that the electrical energy stored in the energy buffer is sufficient to feed the motor controller.

5. The HVAC actuator according to claim 1, further comprising a regulator configured to convert input voltage of the HVAC actuator to a voltage lying in a voltage range of the energy buffer.

6. The HVAC actuator according to claim 5, wherein the regulator is a switching regulator.

7. The HVAC actuator according to claim 5, wherein the power limiting circuit is configured to adjust the threshold depending on a conversion efficiency of the regulator.

8. The HVAC actuator according to claim 1, wherein the energy buffer is a Lithium-ion capacitor.

9. A system comprising a plurality of HVAC actuators according to claim 1, connected to a common power supply line, wherein the common power supply line provides input power to the HVAC actuators, the input power in each case being limited by the power limiting circuits of the HVAC actuators.

10. The system according to claim 9, wherein the power limiting circuits of the HVAC actuators are configured to adjust the thresholds depending on the number of HVAC actuators connected to the common power supply line.

11. The system according to claim 9, wherein the power limiting circuits of the HVAC actuators are configured to adjust the thresholds depending on the power of the common power supply line.

12. The system according to claim 9, wherein the common power supply line comprises a power over Ethernet line.

13. A method of operating an HVAC actuator comprising an electric motor, the method comprising:
   storing electrical energy from a power supply in an energy buffer of the HVAC actuator and providing the electrical energy to the electric motor;
   limiting by a power limiting circuit of the HVAC actuator input power from the power supply to the energy buffer to a threshold lower than motor power drawn by the electric motor from the energy buffer;
   monitoring, by a motor controller of the HVAC actuator, an operating condition of the energy buffer;
   storing, by the motor controller, a safety position; and
   driving the electric motor to the safety position depending on the operating condition of the energy buffer, using electrical energy stored in the energy buffer.

14. An HVAC actuator, comprising an electric motor, wherein the HVAC actuator further comprises:
   an energy buffer configured to store electrical energy from a power supply, and to provide the electrical energy to the electric motor; and
   a power limiting circuit configured to limit input power from the power supply to the energy buffer to a threshold lower than motor power drawn by the electric motor from the energy buffer,
   wherein for a case of zero input power to the HVAC actuator, the energy buffer is configured to operate in a battery mode for driving the electric motor during a time.

15. The HVAC actuator according to claim 14, wherein the HVAC actuator further comprises an activation switch configured to activate the HVAC actuator, from a deactivated, energy conserving state to an active state, for the case of zero input power to the HVAC actuator.

16. The HVAC actuator according to claim 14, wherein the HVAC actuator further comprises a near field communication module configured to activate the HVAC actuator, from a deactivated, energy conserving state to an active state.

17. The HVAC actuator according to claim 14, wherein the energy buffer is configured to accumulate and to store electrical energy during an idle time of the electric motor and to provide electrical energy to the electric motor during an active time of the electric motor.

18. The HVAC actuator according to claim 17, wherein the power limiting circuit is configured to set the threshold such that the electrical energy stored in the energy buffer during the idle time is sufficient to drive the electric motor during the active time.

19. The HVAC actuator according to claim 14, further comprising a regulator configured to convert input voltage of the HVAC actuator to a voltage lying in a voltage range of the energy buffer.

20. The HVAC actuator according to claim 19, wherein the regulator is a switching regulator.

21. The HVAC actuator according to claim 19, wherein the power limiting circuit is configured to adjust the threshold depending on a conversion efficiency of the regulator.

22. The HVAC actuator according to claim 14, wherein the energy buffer is a Lithium-ion capacitor.

23. A system comprising a plurality of HVAC actuators according to claim 14, connected to a common power supply line, wherein the common power supply line provides input power to the HVAC actuators, the input power in each case being limited by the power limiting circuits of the HVAC actuators.

24. The system according to claim 23, wherein the power limiting circuits of the HVAC actuators are configured to adjust the thresholds depending on the number of HVAC actuators connected to the common power supply line.

25. The system according to claim 23, wherein the power limiting circuits of the HVAC actuators are configured to adjust the thresholds depending on the power of the common power supply line.

26. The system according to claim 23, wherein the common power supply line comprises a power over Ethernet line.

27. A method of operating an HVAC actuator comprising an electric motor, the method comprising:
- storing electrical energy from a power supply in an energy buffer of the HVAC actuator and providing the electrical energy to the electric motor; and
- limiting by a power limiting circuit of the HVAC actuator input power from the power supply to the energy buffer to a threshold lower than motor power drawn by the electric motor from the energy buffer,
- wherein for a case of zero input power to the HVAC actuator, the energy buffer is configured to operate in a battery mode for driving the electric motor during a time.

\* \* \* \* \*